March 28, 1961
L. D. MARTIN
2,976,741
CLUSTER GEAR
Filed March 2, 1959
2 Sheets-Sheet 1
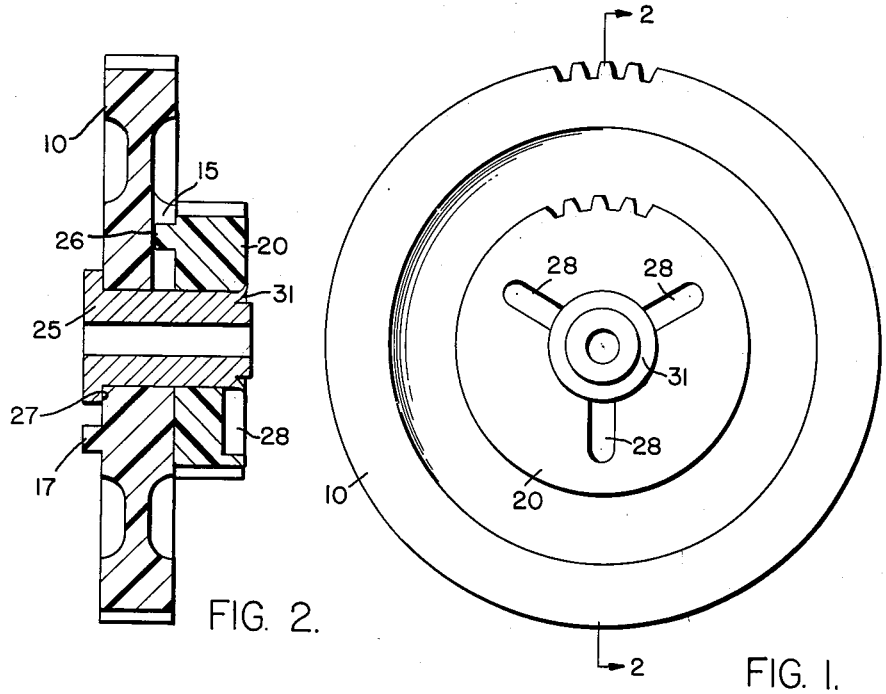
FIG. 2.
FIG. 1.
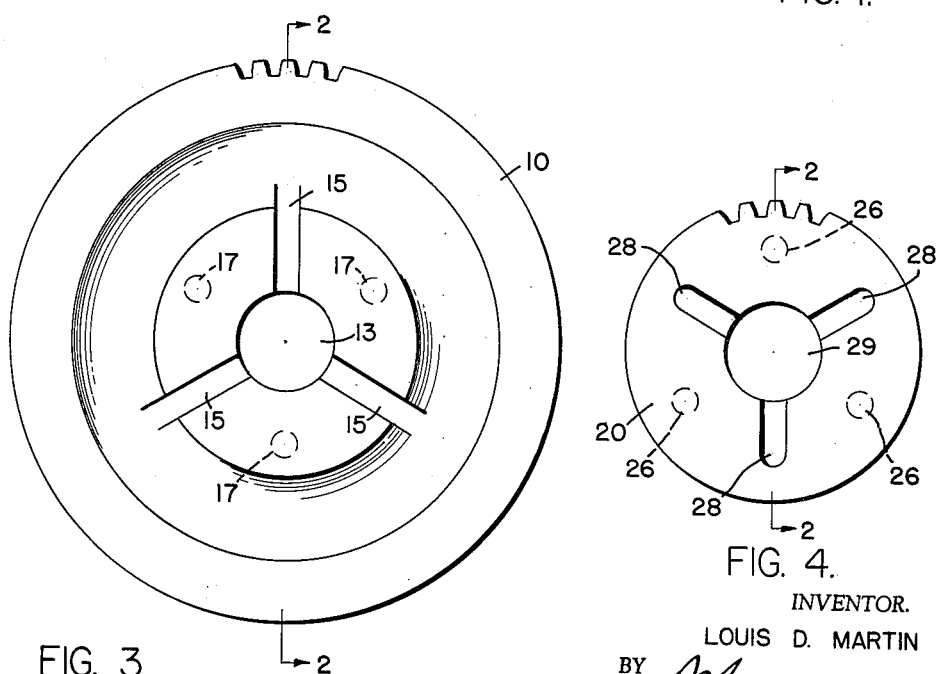
FIG. 3.
FIG. 4.
INVENTOR.
LOUIS D. MARTIN
BY
Attorney March 28, 1961 L. D. MARTIN 2,976,741
CLUSTER GEAR Filed March 2, 1959 2 Sheets-Sheet 2

INVENTOR.
LOUIS D. MARTIN
BY
Attorney

United States Patent Office 2,976,741
Patented Mar. 28, 1961

2,976,741
CLUSTER GEAR

Louis D. Martin, 87 Lake Breeze Park, Rochester 22, N.Y.

Filed Mar. 2, 1959, Ser. No. 796,632

3 Claims. (Cl. 74—432)

This invention relates to cluster gears, and more particularly to injection molded cluster gears.

Many gear manufacturing concerns carry large numbers of individual gears in stock. However, it is not practical to carry gear clusters, which are made up of a large gear and a pinion of the same or dissimilar pitches, because of the infinite number of possible combinations. Assuming, for example, that for a given pitch, a selection of forty individual gears in available from twenty to sixty teeth. To obtain every possible combination of cluster gears of this one pitch and tooth assortment, the number of gear clusters would amount to sixteen hundred combinations. If this pitch assortment is multiplied by ten different pitches, for example, it is possible to have an assortment of sixteen thousand cluster gears. It is evident that such an assortment would entail a tremendous inventory thereby making it absolutely impractical to carry these cluster gears in stock.

Furthermore, at the present time, many gears are made of injection molded plastics, such as nylon. These plastic gears have many virtues over the metal gears and their use in consumer goods is expanding rapidly. However, while these plastic gears are economically practical for large volume production, it is not practical to make them in relatively small quantities because of the high cost of the molds. Therefore, in the case of injection molded cluster gears, the inventory problems resulting from the various combinations and permutations of tooth number and pitch selections are further complicated, by the fact that an individual mold, which is very costly, is required for the injection molding of each of the various possible combinations, so that the stocking of these cluster gears would be completely prohibitive.

The purpose of this invention is to provide an improved cluster gear construction which permits stocking such gears economically.

To this end, one of the objects of this invention is to provide an improved cluster gear construction which will permit of quickly providing a gear cluster of practically any combination of tooth number and pitch while maintaining a relatively small gear inventory.

Another object of this invention is to provide a practical construction by which the cluster gears can be made by assembling two individual gears together in such fashion that they will operate as one part.

Another object of this invention is to provide an improved cluster gear, the component parts of which can be easily assembled and disassembled without damage.

A further object of this invention is to provide an improved cluster gear wherein each of said individual components has integrally formed self-contained coupling attachments.

Other objects of this invention will become apparent from the drawings, the specification, and the appended claims.

In the drawings:

Fig. 1 is a side elevation of a cluster gear constructed in accordance with one embodiment of this invention;

Fig. 2 is a cross-sectional view of the gear cluster taken at line 2—2 of Fig. 1 and looking in the direction of the arrows;

Fig. 3 is a side elevation of the larger gear of the cluster of Figs. 1 and 2;

Fig. 4 is a side elevation of the smaller gear of the cluster of Figs. 1 and 2;

Figure 7:
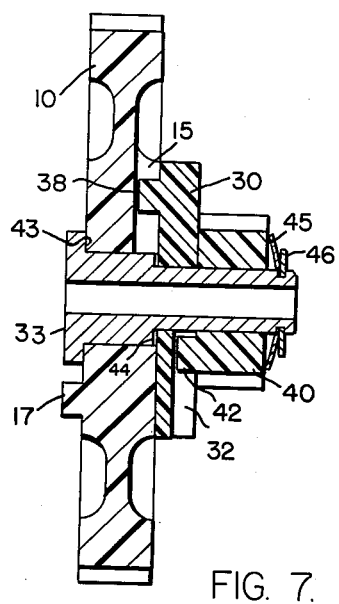
Fig. 7 is a cross-sectional view of a modified gear cluster made up of the individual gears shown in Fig. 3 and Fig. 6 with the separator illustrated in Fig. 5.

In this invention, the cluster gears are made from individual component gears assembled together on a common axis. In the preferred embodiment, one face of each of the component parts is provided with radially extending grooves or recesses, and the other face is provided with axially extending dowels or projections which are angularly spaced and which are disposed on said other face of the gear out of line with the radially-extending slots to give greater strength to the individual component. The axially-extending dowels of one part are engaged in the radial recesses of the adjacent part and serve as torque transmitting means between the components of the gear cluster.

Figure 5:
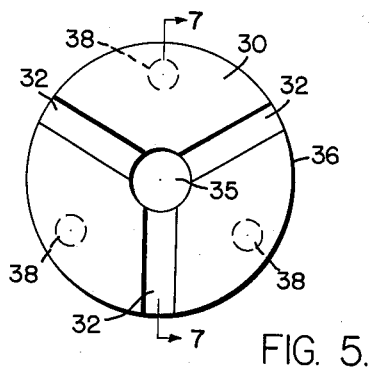
Fig. 5 is a side elevation of one embodiment of a separator adapted to be used in a gear cluster constructed according to this invention.

Referring to the drawings, Figs. 1 and 2 show a gear cluster comprising a large spur gear 10, a spur pinion 20, and a bushing 25. The large spur gear 10 has an axial bore 13 (Fig. 3). One side face of the gear 10 is provided with three radially-extending grooves or recesses 15 which are spaced one hundred twenty degrees from each other and communicate at their inner end with the bore 13. The other side face of the gear 10 is provided with three integrally formed dowels or projections 17 which are also spaced one hundred twenty degrees from each other. One side face of the pinion 20 is also provided with three axially-extending dowels 26 which are spaced one hundred twenty degrees from each other; and the other side face of the pinion 20 has three radially-extending slots or recesses 28 which are also spaced one hundred twenty degrees apart and which communicate at their inner ends with the bore 29 of the pinion. The cluster shown is formed by assembling the spur gear 10 and pinion 20 on the bushing 25 with the dowels 26 engaged in the recesses 15 of the gear 10, and and with the gear 10 seated against the shoulder 27 of the bushing. The bushing 25 is then peened over at 31 to retain the gears 10 and 20 on the bushing and form the cluster unit. It is apparent that the gears 10 and 20 can be assembled on the bushing 25 in reverse position so that the projections 17 of the gear 10 extend into the radial recesses 28 of the gear 20.

Where it is desired to have a different axial spacing of the components of the gear cluster from that shown in Figs. 1 and 2, a separator may be used between the gear components. Such a separator is shown at 30 in Figs. 5 and 7. It has three radially-extending slots or recesses 32 in one side face which are spaced one hundred twenty degrees apart and which communicate at one end with the bore 35 of the separator and which extend to the periphery of the separator. The other side face of the separator 30 has three axially-extending dowels 38 which are also spaced one hundred twenty degrees apart. In the cluster shown in Fig. 7, a pinion of comparatively small diameter is used having dowels 42 on one side face which are spaced one hundred twenty degrees apart but having no recesses on its opposite side face. This is because of the size of the pinion, and also to insure the requisite strength.

To assemble a cluster, such as shown in Fig. 7, the gear 10 is secured on a bushing 33 against a shoulder 43 of the bushing. The separator 30 is mounted on the bushing to face another shoulder 44 of the bushing, and its dowels or projections 38 are engaged in the recesses 15 of the gear 10. The pinion 40 is then assembled over the bushing with its dowels or projections 42 engaged in the recesses 32 of the separator. The entire assembly is held together by a cupped washer 45 which is interposed between the outside face of the pinion 40 and a snap washer 46, which is secured in a key in the bushing 33.

Figure 9:
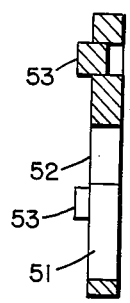
Fig. 9 is a cross-sectional view of this modified separator taken at line 9—9 of Fig. 8.
Figure 8:
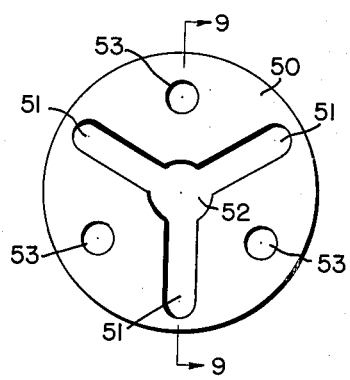
Fig. 8 is a side elevation of a modified separator which may be used to make up a portion of the gear cluster.

Figs. 8 and 9 show a modification of a separator which may be stamped from a metal disc. This separator 50 has an axial bore 52 and three radially extending slots 51 which are perforated through the disc and communicate at one end with the bore 52. The slots 51, which are spaced one hundred twenty degrees apart do not quite reach the periphery of the disc, thus allowing a practical wall thickness. Angularly spaced between each of the slots 51 are three cylindrically shaped slugs, which are perforated part way through to form axially-extending dowels 53 on one side face of the separator. It is obvious that this separator 50 can be used in place of the plastic separator 30 shown in Fig. 7.

Figure 6:
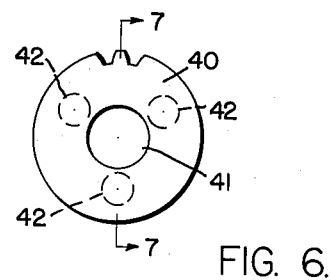
Fig. 6 is a side elevation of a still smaller gear adapted to form a part of the gear cluster constructed according to another embodiment of this invention.

From what has been said above, it is apparent that cluster gears having an infinite number of combinations may be formed according to this invention from the simple, single, inexpensive component parts, and no greater inventory is required than would be stocked for individual gears. For instance, while the cluster gear shown in Fig. 7 uses a single separator, it is obvious that there may be cases where several separators are needed to orient one gear component from another at any desired position. It is also possible to construct a double cluster in which a gear such as is shown in Fig. 3, for example, may be sandwiched between two smaller gears, such as are shown in Fig. 4 and 6, with or without a separator. It is apparent that the cluster gear may be assembled and disassembled quickly without impairing or damaging any of the individual components, so that a part can be removed from one cluster and used in another cluster if desired.

Although the individual component parts herein, especially the gears and separators, are preferably formed of plastic, nylon or its equivalent, by the injection molding process, it is understood that they may be made of metal, or powdered metal, and formed by stamping, coining processes, or by die casting techniques.

While in the embodiments shown, there are three radial slots or recesses, and three dowels or projections, it is evident that any number may be used. It is also evident that the angular spacing between each of the dowels and the slots may be varied depending on the number used.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A cluster gear comprising a plurality of separate components which are respectively of different diameters and two, at least, of which are plastic, and two, at least, of which, are gears having peripherally arranged teeth each of said components having an axial bore, a bushing extending through the bores of all said components to mount them for rotation on a common axis, each of said components having a plurality of elongated, radially-extending recesses formed in one side face and spaced angularly about its axis and a plurality of axially-extending projections integrally formed on its opposite side face, said projections being equal in number to said recesses and being spaced angularly about its axis at the same angles as said recesses, the projections of one component fitting into the recesses of an adjacent component to transmit torque between the components, and means securing said components together against relative axial motion.

2. A cluster gear according to claim 1 wherein there are three projections and three recesses on each component, and wherein the projections on one side face of a component are spaced angularly approximately sixty degrees from the recesses on the other side face of the component.

3. A cluster gear comprising a pair of toothed plastic components, and a separator component disposed between said pair, each of said components having an axial bore, said toothed components having different tooth numbers and diameters, said separator being of less diameter than at least one of said toothed components, a metallic bushing extending through the bores of all said components to mount them for rotation on a common axis, each of at least two adjacent components having a plurality of elongated radially-extending recesses formed in one side face and a plurality of integrally-formed axially-extending projections on its opposite side face, the projections being spaced equi-angularly about said common axis, and said recesses being also spaced equi-angularly about said common axis and having the same spacing as said projections, said projections and recesses constituting coupling means, the projections of one of said two adjacent components fitting into the recesses of the other adjacent component to couple said two adjacent components together and to transmit torque between said two adjacent components, the third component having coupling means at least on its side face which is adjacent said separator component to interengage with the coupling means on the adjacent side face of said separator component to couple said third component with said separator component to transmit torque between said third component and said separator component, and means securing all said components together against relative axial motion.

References Cited in the file of this patent

UNITED STATES PATENTS

| 1,109,900 | Coleman | Sept. 8, 1914 |
| 1,520,625 | Wigley | Dec. 23, 1924 |
| 1,532,962 | Turner | Apr. 7, 1925 |
| 1,645,701 | Hopkins | Oct. 18, 1927 |
| 2,183,641 | Double | Dec. 19, 1939 |
| 2,457,942 | Van Landt | Jan. 4, 1949 |
| 2,709,375 | Sandberg | May 31, 1955 |
| 2,780,265 | Brancato | Feb. 5, 1957 |
| 2,857,777 | Porter | Oct. 28, 1958 |

FOREIGN PATENTS

| 405,279 | Germany | Nov. 1, 1924 |
| 924,666 | Germany | Mar. 7, 1955 |